UNITED STATES PATENT OFFICE.

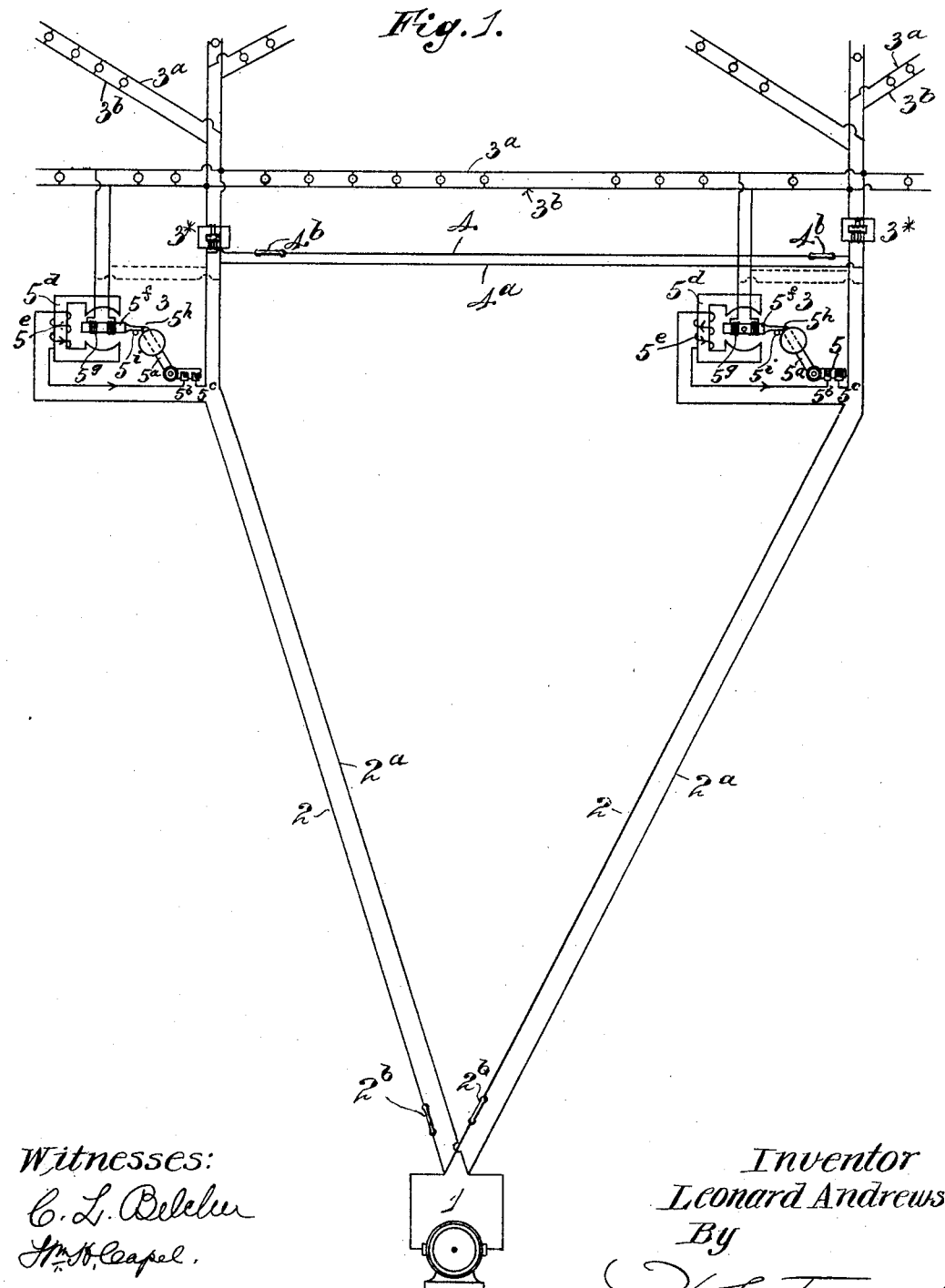

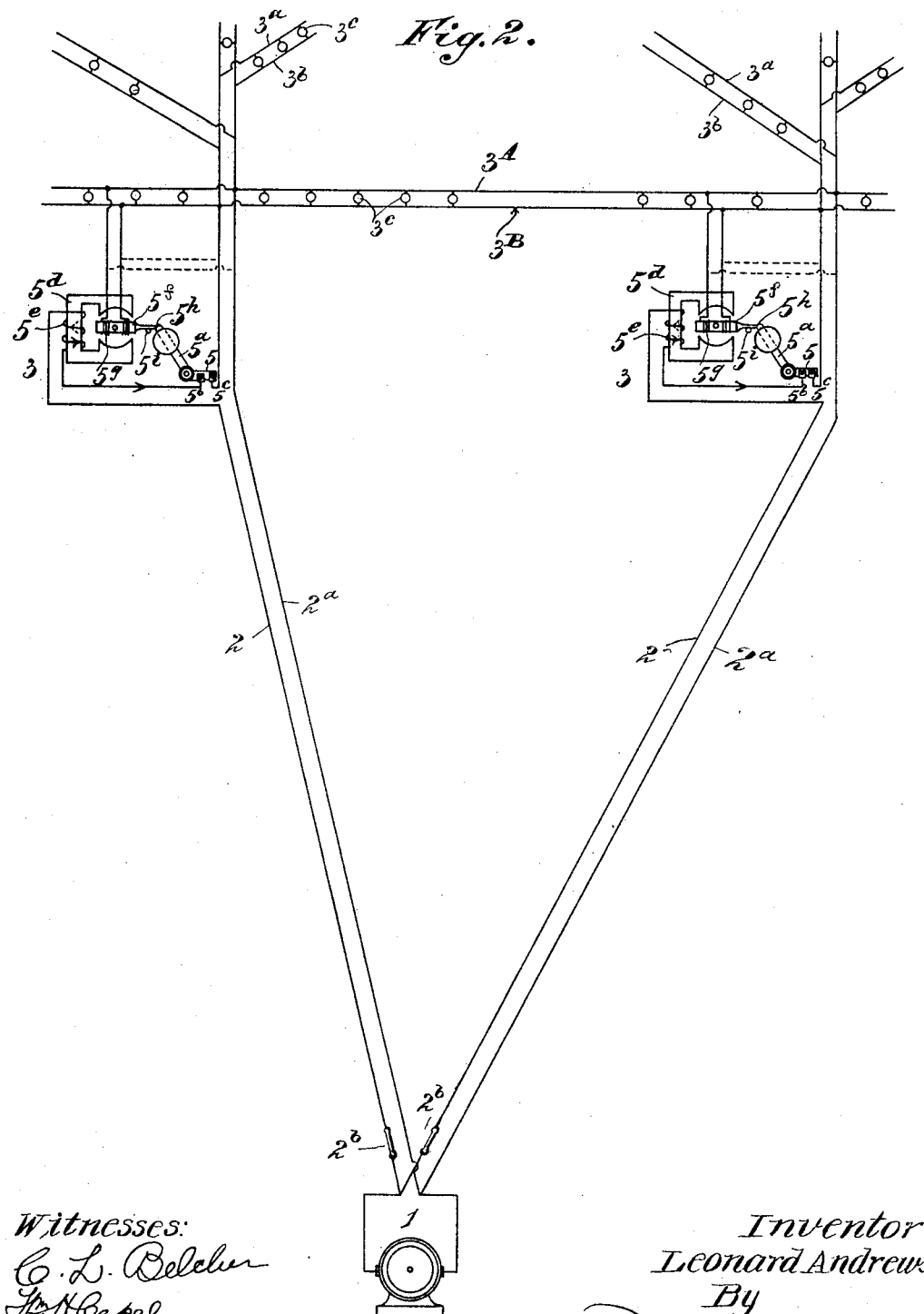

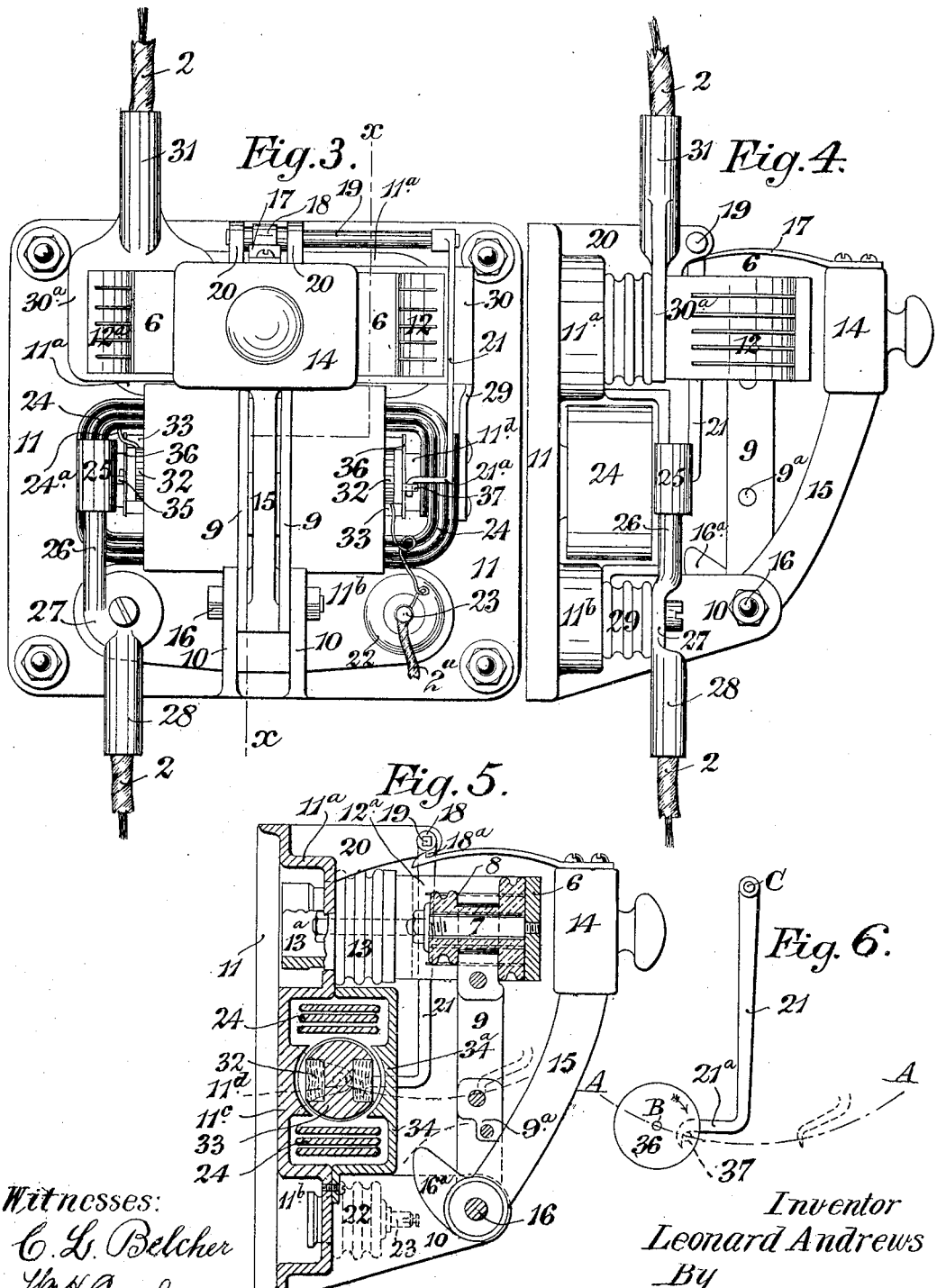

LEONARD ANDREWS, OF HASTINGS, ENGLAND.

SYSTEM OF ELECTRICAL DISTRIBUTION.

SPECIFICATION forming part of Letters Patent No. 638,085, dated November 28, 1899.

Application filed April 4, 1898. Serial No. 676,280. (No model.)

*To all whom it may concern:*

Be it known that I, LEONARD ANDREWS, a subject of the Queen of Great Britain and Ireland, residing at Hastings, in the county of Sussex, England, have invented Improvements in or Relating to Systems of Electrical Distribution, of which the following is a specification.

In electrical distributing systems in which electrical energy is distributed from a central station to substations or distributing-points (hereinafter called "substations") by means of feeders it has heretofore been common to provide the feeders with hand-operated switches and to interconnect the substations by conductors, (hereinafter called, for distinction, "auxiliary feeders,") so that any main feeder may be temporarily cut out for repair or other purpose without interrupting the supply of electricity to the substation to which it is connected. Where feeders and substations are arranged in this manner, it is usual to insert an excess-current cut-out, such as a safety-fuse or magnetic or other excess-current cut-out, at each end of each feeder—viz., where it leaves the generating-station and where it is connected to the substation—so that should a short circuit occur on any feeder the safety devices at its extremities will immediately cut it out of circuit. It not unfrequently happens, however, that the cut-outs in a healthy feeder will operate before the cut-out at the distributing end of the faulty feeder, owing to the fact that the healthy feeder has to carry sufficient current to operate the faulty-feeder's cut-out in addition to the useful work normally supplied by both feeders, with the result that the supply of electricity to the district fed by the two feeders will be interfered with.

Now this invention has for its object to obviate this great disadvantage. For this purpose I provide in connection with the outgoing and return feeders, near to their points of connection with each substation, automatic cut-out apparatus so constructed and arranged that it will carry as heavy a current as the feeders so long as the electric energy is being supplied from the generating-station to the distributing-station, but will cut out with a comparatively small current returning toward the generating-station, the construction of the cut-out apparatus, moreover, being such that interruption in the supply of energy from the generating-station will have no action on the cut-out apparatus. The main feeders between the generating-stations and substations, and also, it may be, the auxiliary feeders between the substations, are provided, as usual, with excess-current cut-outs at points near where they pass outward from the generating and sub stations.

Cut-out apparatus to operate in the manner described may conveniently comprise a movable switch or cut-out device arranged in the main feeder and controlled by an electromagnetic device comprising a series coil or coils arranged in circuit with the main feeder, a shunt coil or coils connected across the main feeder and return lead near to the substation, a magnetic core or cores, and operating mechanism between the core or cores and the switch or cut-out device, the series and shunt coils being so proportioned and arranged that the core or cores will not act to open the feeder-circuit so long as current below, at, or above the normal amount is being supplied from the generating-station nor when the supply of current is cut off, but will act to open the switch or cut-out in the event of current being supplied in the reverse direction—viz., from the substation to the main feeder—as would be the case should a fault occur in such feeder between the generating and sub stations. I arrange the coils and core or cores in such a way that a forward magnetic pull will be exerted in one direction with a current supplied from the generating-station and a backward magnetic pull with a current supplied from the substation to the feeder to which the coils are connected, so that nothing but an actual flow of current through the electromagnetic device in the reverse direction to that required for supply purposes will cause the switch or cut-out to be operated, so as to disconnect the feeder from the substation. Consequently a fault in one feeder will not cause the cut-out or cut-outs of a healthy feeder which will then be called upon to supply current to the substation normally supplied by the faulty feeder to open the circuit of such healthy feeder and interfere with the electric supply.

Apparatus to operate in the manner described can be constructed in various forms. According to one construction such apparatus comprises a magnetic device having two distinct windings and one or more iron cores, one of the windings being connected in series with one of the feeders and the other connected as a shunt across the feeders, the movable core or cores being mechanically connected to a catch device for releasing a weight or spring for operating the switch or cut-out device proper. The two windings are so arranged relatively to each other that their combined influence upon the iron core or cores tends to move it or them in one direction with a forward current and in the reverse direction with a return-current. When the current in the feeders is flowing in its normal direction, the movement of the core or cores tends to securely lock the catch in position; but when the series current is reversed relatively to the current in the shunt then the movement of the core or cores tends to release the catch and open the switch or cut-out.

Figure 1 of the accompanying drawings is a diagram showing a high-tension electrical distributing system comprising a central generating-station connected to interconnected substations by feeders provided with automatic cut-out apparatus according to this invention. Fig. 2 is a diagram illustrating a modified arrangement of an electrical distributing system embodying my invention. Figs. 3 and 4 are elevations at right angles to each other, showing one construction of return-current cut-out suitable for carrying out my invention; and Fig. 5 is a vertical section of such apparatus on the line $xx$ of Figs. 3 and 4. Fig. 6 is a detail view.

1, Fig. 1, is a central generating-station connected by main feeders 2 to transformer-substations 3, which are interconnected by auxiliary feeders or conductors 4, by means of which any one of the feeders 2 connected to such interconnected substations can be temporarily cut out of action for repair or other purpose without interrupting the supply of electricity to the substation to which it was directly connected, such substation then receiving its supply of electricity through the auxiliary feeder 4, connecting it with another substation. $2^a$ and $4^a$ are the return-leads of the main and auxiliary feeders, respectively. In an alternating-current system the mains 2 $2^a$ and also mains 4 $4^a$ are of course each alternately positive and negative. $2^b$ and $4^b$ indicate ordinary excess-current cut-outs, such as safety-fuses or magnetic or other excess-current cut-outs, arranged at the ends of the main and auxiliary feeders 2 and 4, where they leave the central generating-station 1 and substations 3. Each substation in this case comprises one or more transforming devices $3^\times$ for supplying electrical energy to local circuits $3^a$ $3^b$. In a continuous-current system of distribution the transforming devices may be of the kind known as "motor-transformers," each consisting of a combined motor and dynamo. In an alternating-current system of distribution such as shown in Fig. 1 the said transforming devices may be ordinary induction-transformers having primary and secondary windings.

The automatic return-current cut-outs, arranged in connection with the feeders 2 $2^a$ near to their points of connection with each substation, as hereinbefore described, are indicated diagrammatically at each substation. Each of these cut-outs comprises a movable switch or contact 5, that is provided with a weighted arm or lever $5^a$, is adapted to engage with fixed contacts $5^b$ $5^c$, connected to the adjacent parts of the main feeder 2, and is controlled by an electromagnetic device comprising a field-magnet $5^d$, made in the form of a bent iron core provided with a series winding $5^e$, and between the polar ends of which a rotary armature-core $5^f$, provided with a shunt-winding $5^g$, is so pivoted that the normal position of its field is approximately at right angles to the field produced by the series winding, the armature in this position acting through a catch device $5^h$, formed, in the example shown, by the free end of the switch arm or lever $5^a$, to normally hold the said arm or lever in the raised position and the switch 5 in the closed position. This position of the armature is insured, when no current is flowing through the cut-out device, by loading the armature $5^f$ by means of a spring or weight, so that it normally bears against a fixed stop $5^i$. The series winding $5^e$ is arranged in series with the feeder 2. The shunt-winding $5^g$ may be connected as a shunt across the feeders 2 $2^a$, as shown in dotted lines, or across the distributing-mains $3^a$ $3^b$, fed from such feeders, as indicated in full lines. In the former case the shunt-winding may be connected to the secondary winding of a transformer, the primary winding of which is connected as a shunt across the feeders 2 $2^a$. These different arrangements are electrically the equivalent of one another for the purpose required. As will be seen, the arrangement is such that when current is being supplied from the generating-station to the substations the direction of the currents through the series and shunt windings of each cut-out device at a given moment will be represented by the arrow-heads (shown in full lines) and the polarity of the field-magnet poles and armature-poles by the letters N and S thereon, the relative direction of the currents in the shunt and series windings being such as to tend to cause the armature to rotate in a clockwise direction against the stop $5^i$ and so to securely lock the switch 5 in the closed position, in which position it will obviously be also maintained when no current is flowing through the main feeder and cut-out device. If, however, either of the main feeders 2 should become short-circuited, current will be supplied to it from the corresponding substation in the direction of the generating-station and will flow through the series winding of the cut-out device in the opposite direction or that shown by the dotted arrows, whereas the direction of the current in the shunt-winding will remain unchanged. As in this case the direction of the series current relatively to that of the shunt-current will be reversed, the armature will rotate in a counter clockwise direction and release the weighted switch-lever 5ª, which will immediately fall, and by opening the switch 5 disconnect the main faulty feeder from the substation.

The induction of the shunt-circuit must be carefully adjusted to produce the requisite lag in phase of the shunt-current necessary to obtain the greatest torque between the two magnetic fields at the time when the armature is required to release the loaded switch.

Fig. 2 shows diagrammatically a low-tension system of electrical distribution provided with return-current cut-outs according to this invention. In this case each pair of main feeders 2 2ª from the generating-station 1 extends to one or more substations 3, from which extend the distributing-mains or local circuits 3ª 3ᵇ, which contain lamps or other translating devices 3ᶜ and which are connected direct to the feeders 2 2ª without the intervention of electric transformers. Some of the distributing-mains, such as those marked 3ᴬ 3ᴮ, may connect the main feeders 2 2ª of different substations, and thus be available for use as auxiliary feeders, as and for the purpose hereinbefore described. The return-current cut-outs shown are like those hereinbefore described with reference to Fig. 1 and act in the same way.

Figs. 3, 4, and 5 show one construction of return-current cut-out that may advantageously be used in carrying out my invention. In this construction 6 is the movable switch or contact, consisting of a channeled piece of conducting material—for example, bronze—secured by a bolt 7 to a porcelain or like insulator 8, having a corrugated exterior and carried by a bar 9, that is made in two parts, so that the insulator can be clamped between their free ends. The other end of the bar 9 is pivoted to a bracket 10, extending from an iron base-plate 11, designed to be held in a vertical position against a wall or like support. The ends of the said movable contact-piece 6 are arranged to be each forced between a pair of split metal spring-contacts 12 12ª, each pair being carried by a porcelain or like insulator 13, having a corrugated exterior and a hollow base 13ª, that is fixed in a raised or channeled part 11ª of the base-plate 11 by lead, sulfur, or like cementing material, the arrangement being such that when the fixed and movable contacts 12 and 6 are properly engaged the pivoted bar 9 is vertical or approximately so. At the outer side of the movable contact 6 is a weight 14, carried by the curved arm 15 of a lever pivoted upon the same pin 16 as the bar 9, carrying the movable contact 6, and the other arm 16ª of which is made short and so arranged that when the weight has been released and has by falling acquired some momentum it will strike against an abutment 9ª on the bar 9 and rapidly disengage the movable contact 6 from the fixed contacts 12. The weight 14 has secured to its upper part a spring-catch 17, adapted to engage with a tooth or shoulder 18ª on a collar or disk 18, fixed to a horizontal spindle 19, that is mounted in brackets 20, extending from the upper part of the base-plate 11, and has fixed to it the upper end of a trip-lever 21. At the lower part of the iron base-plate 11 is another raised or channel part 11ᵇ, to which is secured, by lead, sulfur, or like material, a corrugated porcelain insulator 22, carrying a binding-screw 23 or equivalent for connection to a return-main 2ª, Fig. 1. Centrally between the two raised chaneled parts the base-plate is provided with a projecting part 11ᶜ, having a curved surface and designed to serve as a pole-piece. In the space between this pole-piece and the raised or chaneled parts 11ª 11ᵇ is arranged a series coil or winding 24, which may advantageously consist of a few turns of copper tape insulated from each other and designed to carry the greatest current the apparatus will be called upon to carry. The inner end of this coil is fixed to a metal plate 25, carried by a metal rod 26, extending from a boss 27, which is provided with a metal socket-piece 28, in which one end of the feeder 2, Fig. 1, is electrically secured and which is carried by another insulator 29, secured to the lower raised or channel part 11ᵇ of the base-plate 11. The plate 25, rod 26, boss 27, and socket-piece 28 may consist of a bronze or other metal casting. The other end of the series winding 24 is secured to a metal supporting-piece 29, connected to a plate 30, carrying one—say 12—of the pairs of fixed contacts 12 12ª. The plate 30ª carrying the other pair of fixed contacts 12ª is formed with a socket-piece 31, in which is fixed one end of the adjoining length of the main feeder 2. 32 is the shunt-winding of fine wire wound upon an ordinary shuttle-shaped iron-core 33, mounted on knife-edge or other bearings in lugs 11ᵈ, projecting from the base-plate 11 and located within the series winding 24, one end of the shunt-winding being connected to the series winding, as at 24ª, and the other end to the insulated terminal 23. Over the series and shunt windings 24 and 32, respectively, is or may be fixed an iron plate 34, having a pole-piece 34ª, arranged opposite to the pole-piece 11ᶜ on the base-plate, so that when the series winding is traversed by an electric current the iron plate will form, with the base-plate, a double magnetic circuit, which is completed through the core 33 of the shunt-winding, which is arranged between the polar projections 11ᶜ and 34ª. This core 33 and shunt-winding 32 are normally held in about the position shown in Fig. 4, so that the diametrical line jointing the poles of the core is at right angles or nearly so to the diametrical line joining the polar projections magnetized by the series winding. The armature-core 33 may be held in this position against a stop 35, carried, say, by the plate 25, by a weight or spring, hereinafter called a "weight," preferably by making the lower polar side or end of the said armature-core 33 heavier than the other. To one of the plates 36 at the end of the armature-core is fixed a pin 37, that engages the lower bent end 21ª of the trip-lever 21, so as normally to hold the trip-lever 21 in a position to hold up the pivoted weight 14. The point of contact between the said pin 37 and bent end 21ª of the lever is so arranged, as shown more clearly in Fig. 6, that it is located in an arc A A, that passes through the longitudinal axis B of the armature 33 and has its center at the axis C, about which the trip-lever 21 turns, and the said bent end of the lever is so shaped that the pin can move over it in a direction to release it—viz., in the direction of the arrow, Fig. 4—without having to move the said lever and connected parts. By this construction the trip device is rendered very sensitive and reliable, as the only resistance which the coil and core when moved backward by a return-current have to overcome is that due to friction between the pin and lever, which is small and may be rendered still less by placing an antifriction-roller on the pin. Consequently a small return-current will suffice to effect the automatic opening of the switch or cut-out. The arrangement of the shunt-motor is such that current flowing in a forward direction through the series winding 24 will assist the armature-weight to hold the shunt-core 33 and winding 32 in the position shown in Fig. 4; but a return-current in the said series winding will overcome the armature-weight and turn the shunt core and winding in the opposite direction sufficiently to disengage the trip-pin 37 from the end 21ª of the trip-lever 21 and release weighted lever 15 16ª, which in falling will strike against the abutment 9ª and rapidly turn the movable contact into the open position, so as to effect a quick break in the feeder-circuit and prevent dangerous arcing.

In speaking of the direction of current I do not intend to exclude alternate currents; but have described the invention for simplicity with direct-current examples. I apply my invention in the case of alternate-current working by making the apparatus according to the principles well understood, by which, although the currents are alternating, the simultaneous directions of the currents act relatively, as described with reference to direct currents.

What I claim is—

1. In an electrical distributing system, the combination of a source of electrical energy, substations, feeders connecting said source with the said substations, an automatically-opening return-current cut-out at each station, means for normally holding the cut-out closed, and a motor controlling said holding means and having series windings located in the feeder-circuit and each motor adapted to release the cut-out-holding means only upon reversal of current in the feeder-circuit when the same is traversed by a current from the substation, as set forth.

2. In an electrical distributing system, the combination with a generating-station, substations fed therefrom, outgoing and return feeders connecting said generating-station with said substations, auxiliary feeders interconnecting said substations, and automatic return-current cut-outs each arranged in connection with the outgoing and return feeders near to their points of connection with the corresponding substations, and each having a bias tending to open it, an electric motor controlled by the feeder-current and adapted to act against the bias of the cut-out to keep it closed while current is being supplied to the substation and also when no current traverses the feeder-circuit, and adapted to release the cut-out and permit it to open only upon a reversal of current in the feeder-circuit causing it to flow from the substation toward the generating-station, as set forth.

3. In a system of electrical distribution, the combination of a generating-station, substations, main feeders connecting said generating-station to said substations, auxiliary feeders interconnecting said substations, switches adapted to automatically open the main-feeder circuits at points near to the substations, a detaining device for holding said switches closed, and electromagnetic devices arranged in the feeder-circuits and each adapted in response only to a reversal of current in the feeder to release the detaining device and permit the switch to open, substantially as set forth.

4. In a system of electrical distribution, the combination of a generating-station, substations, main feeders connecting said generating-station to said substations, auxiliary feeders interconnecting said substations, switches adapted to automatically open the main-feeder circuits at points near to the substations and shunt-motors for controlling said switches, each of said shunt-motors having its series winding in a main-feeder circuit and its shunt-winding across the said main feeder and its return-conductor, and a catch connected with the motor for holding the corresponding switch closed both when traversed by current supplied to the corresponding station and when such current is cut off, and disengaged from said switch by the motor when the feeder-circuit is traversed by a current supplied from the substation toward the generating-station, as set forth.

5. In an electrical distributing system, the combination with a generating-station and substations connected thereto by feeders, of an electromotive device having a wire-wound armature, an electromagnetic field therefor, one of said parts being in series in the feeder-circuit, an automatically-opening switch, a detaining mechanism for said switch connected with said armature and whereby the switch is held closed until the armature is moved by a reversal of the current in the feeders, substantially as set forth.

6. In a system of electrical distribution, the combination of a generating-station, substations, main and return feeders connecting said substations to said generating-station, auxiliary feeders interconnecting said substations, and return-current cut-out apparatus controlling each main feeder, each cut-out apparatus comprising a switch for mechanically opening and closing the corresponding main-feeder circuit at a point near to the corresponding substation, a weight adapted when released to fall and strike the switch into its open position, a trip device adapted to hold the weight in its raised and inoperative position, and a shunt-motor having a magnetic field excited by a series winding in the feeder-circuit and a loaded movable armature-core that is excited by a winding in a shunt between the feeder and its return-conductor, and is adapted normally to hold the trip-lever in its inoperative position, said series and shunt winding being so arranged that when current is being supplied from the generating-station to the corresponding substation, and also when current is cut off, the armature-core will tend to rotate in a direction to hold the trip-lever in its inoperative position, and when current is supplied from the substation toward the generating-station, the armature-core will partly rotate in the reverse direction and release the trip device and weight, substantially as described for the purposes specified.

7. In an electrical distributing system, the combination with a generating-station and substation connected thereto by feeders, of a motor having a rotary wire-wound armature, an electromagnetic field therefor, one of said parts being in series in the feeders, a circuit-opening switch in the feeders having a weight tending to open the same, and a detaining mechanism for said weight connected with the armature and retained thereby until said armature is rotated upon reversal of current in the feeders substantially as set forth.

Signed at 2 Pope's Head Alley, Cornhill, in the city of London, England, this 28th day of February, 1898.

LEONARD ANDREWS.

Witnesses:
WM. O. BROWN,
EDMUND S. SNEWIN.